United States Patent [19]

Lawlor

[11] 3,800,294

[45] Mar. 26, 1974

[54] SYSTEM FOR IMPROVING THE RELIABILITY OF SYSTEMS USING DIRTY MEMORIES

[75] Inventor: Francis Daniel Lawlor, Hyde Park, N.Y.

[73] Assignee: International Business Machines Corporation, Armonk, N.Y.

[22] Filed: June 13, 1973

[21] Appl. No.: 369,666

[52] U.S. Cl. .......................... 340/172.5, 340/173 R

[51] Int. Cl. ........................ G11c 11/00, G06f 13/00

[58] Field of Search ...... 340/172.5, 173 R, 174 ED, 340/146.1 R

[56] References Cited

UNITED STATES PATENTS

| | | | |
|---|---|---|---|
| 3,234,521 | 2/1966 | Weisbecker | 340/172.5 |
| 3,331,058 | 7/1967 | Perkins | 340/172.5 |
| 3,350,690 | 10/1967 | Rice | 340/172.5 |
| 3,422,402 | 1/1969 | Sakalay | 340/172.5 |
| 3,434,116 | 3/1969 | Anacker | 340/172.5 |
| 3,444,526 | 5/1969 | Fletcher | 340/172.5 |
| 3,585,607 | 6/1971 | DeHaan et al. | 340/173 R |
| 3,644,902 | 2/1972 | Beausoleil | 340/173 R |
| 3,681,757 | 8/1972 | Allen et al. | 340/172.5 |
| 3,714,637 | 1/1973 | Beausoleil | 340/173 R |
| 3,715,735 | 2/1973 | Moss | 340/173 R |

*Primary Examiner*—Paul J. Henon
*Assistant Examiner*—Jan E. Rhoads
*Attorney, Agent, or Firm*—Bernard M. Goldman

[57] ABSTRACT

Enables any "dirty" hardware portion of main memory (i.e. "dirty" means causing correctable errors) in a computer system to be used for operations which read its contained data or program, as long as the content of the portion is not changed and an I/O copy of the identical content exists. The "dirty" condition indicates that the error correction capacity has already reached its limit for at least one unit of data in the memory portion. Whenever a change is required to be made in the content in a "dirty" portion, and before the change is permitted to be made, the invention automatically transfers the content to a "clean" hardware portion in the main memory (i.e. "clean" means causing no errors).

The "dirty"/"clean" condition of a portion of main memory is checked during every memory fetch operation, and a "dirty" bit is set if a correctable error is detected in any unit of data in the portion.

Hence the invention prevents an error from occurring to data which otherwise would be changed in a "dirty" portion where it is not correctable due to error correction capacity having been previously exhausted, and no I/O copy exists for the changed data. The invention forces all errors in changed data to occur in a "clean" portion where the errors are more likely to be correctable by available error correction.

9 Claims, 16 Drawing Figures

FIG. 2A (METHOD FOR SETTING DIRTY BIT D IN ELEMENT i)
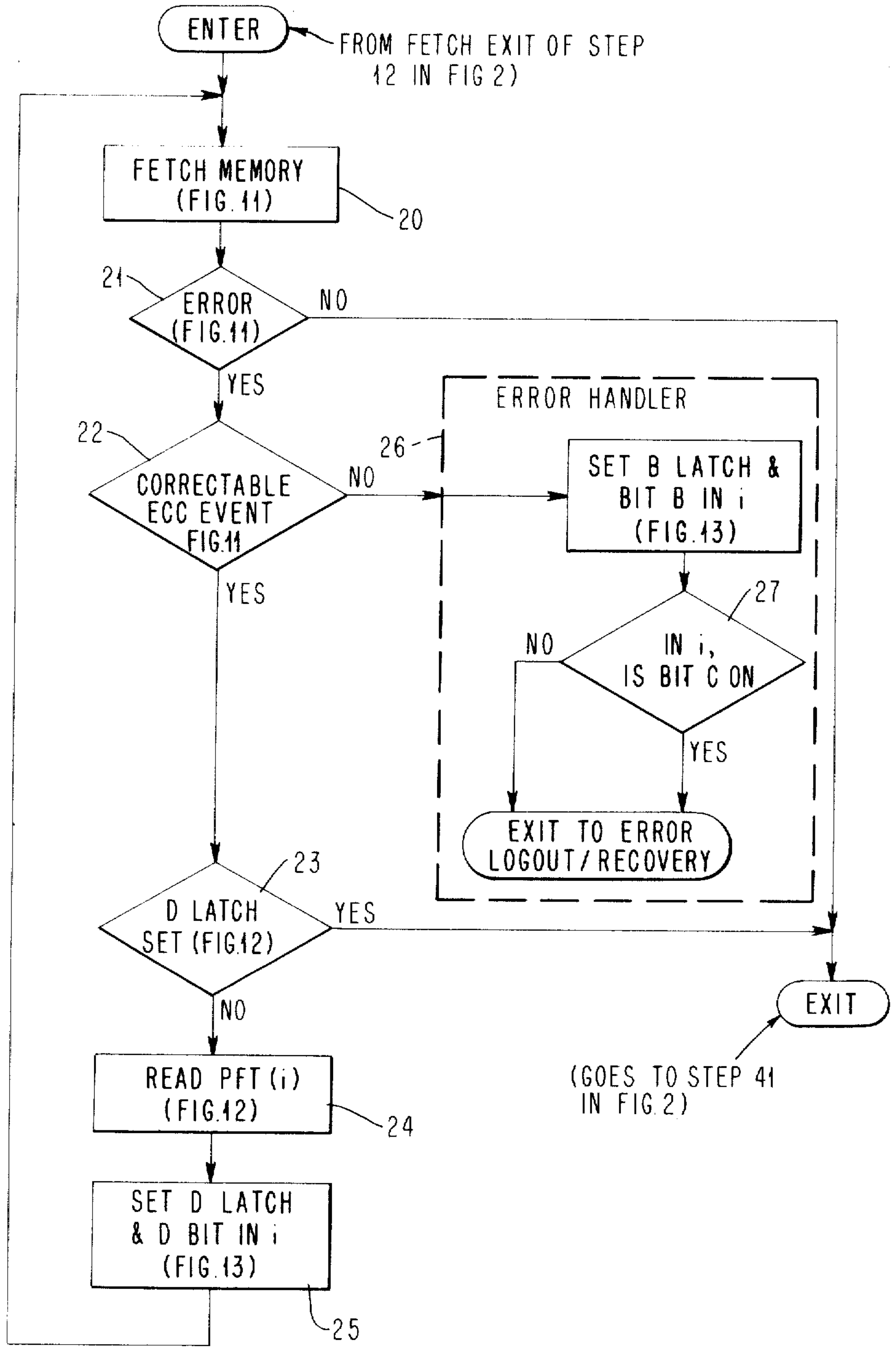

FIG. 3 (ACCESSING PFT ELEMENT i)
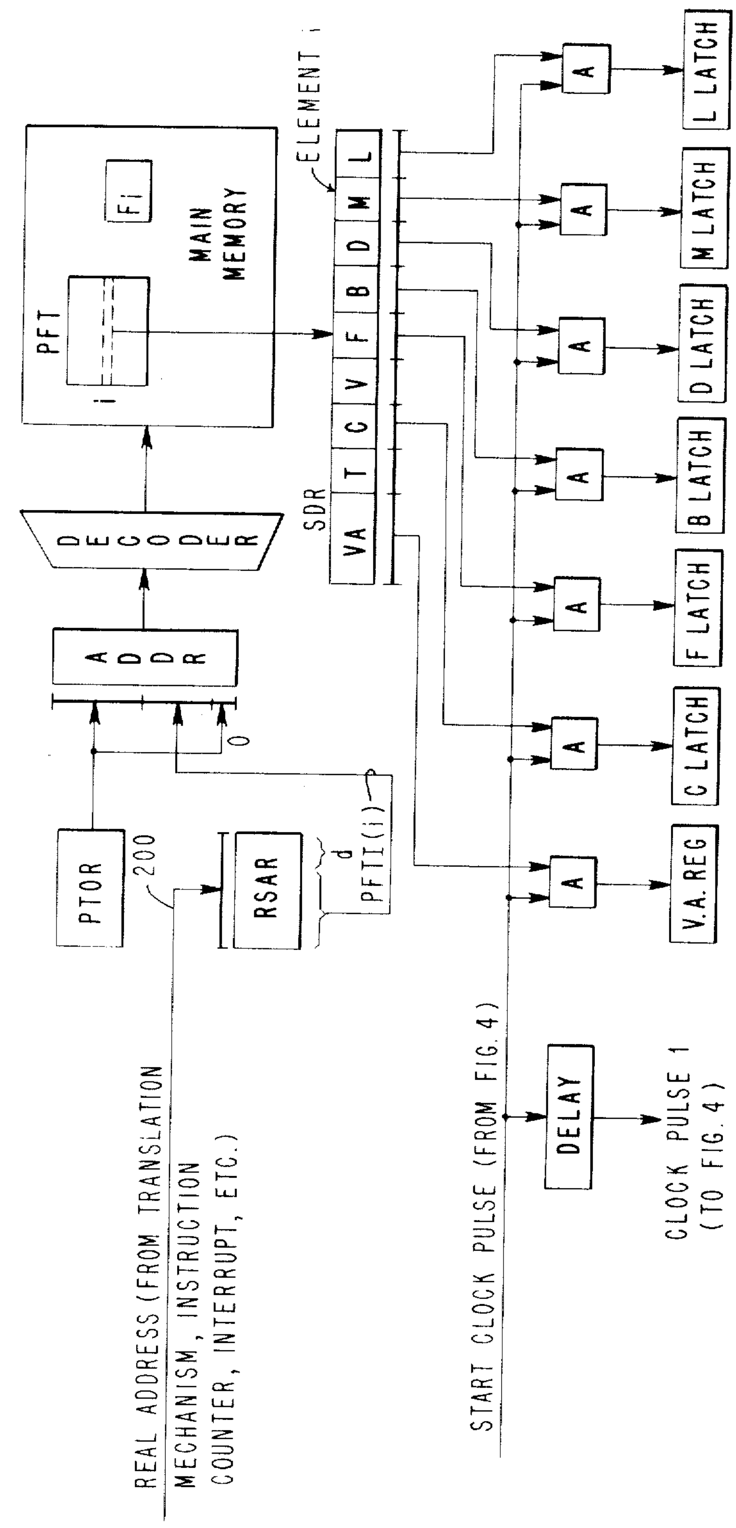

FIG. 4
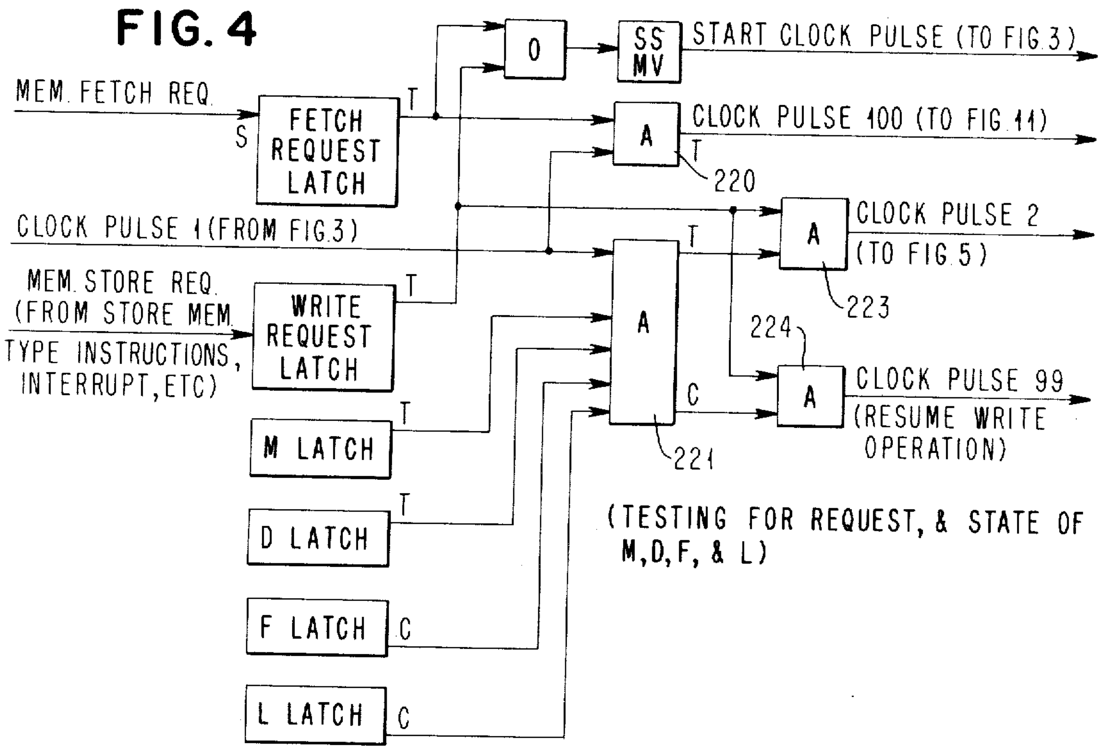
FIG. 5 (LOCKING Fi)
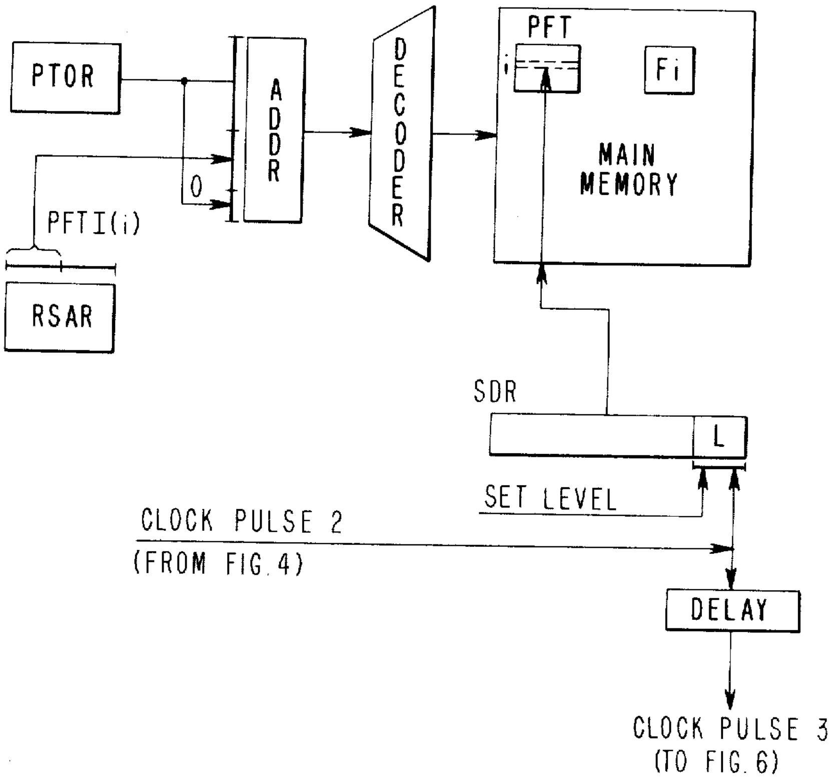

FIG. 6 (ALLOCATING CLEAN FRAME Fj BY SCANNING PFT)
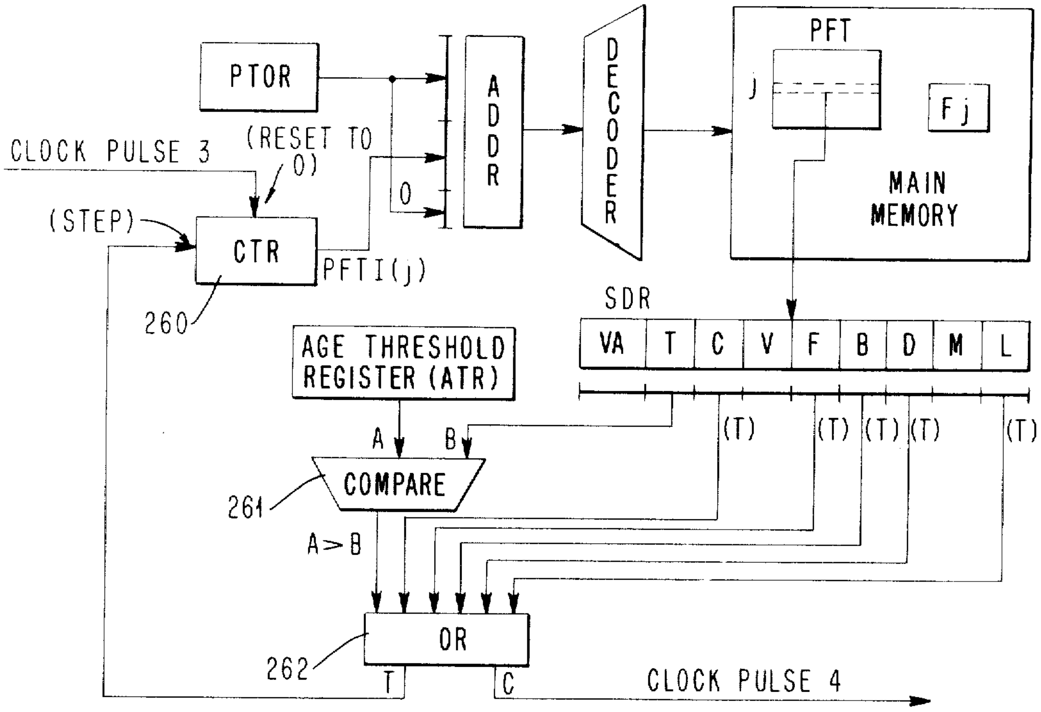
FIG. 6A (LOCKING Fj)
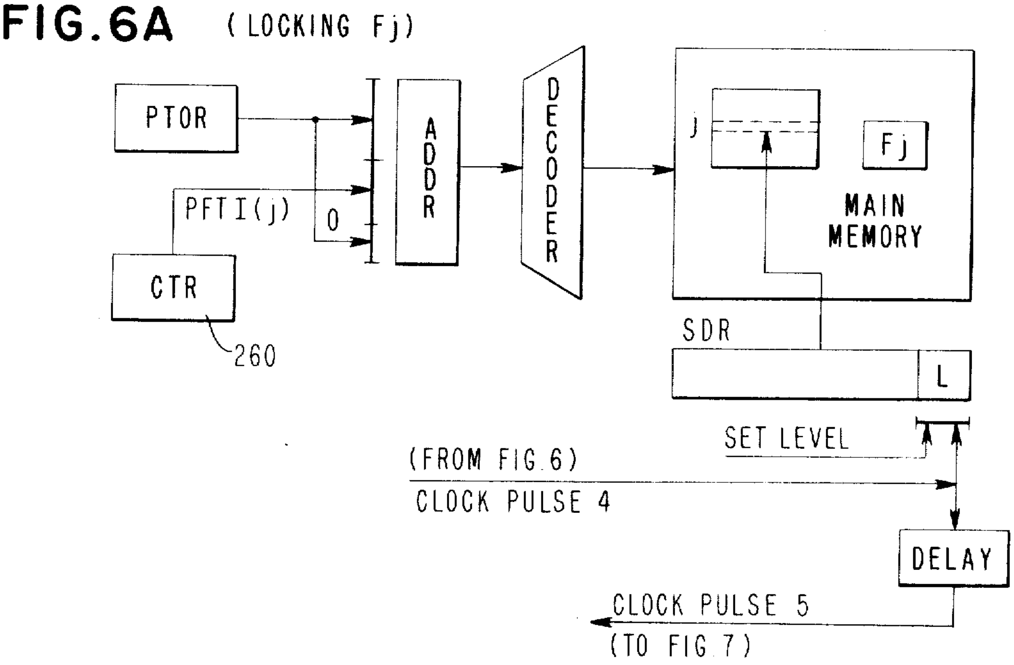

FIG. 7
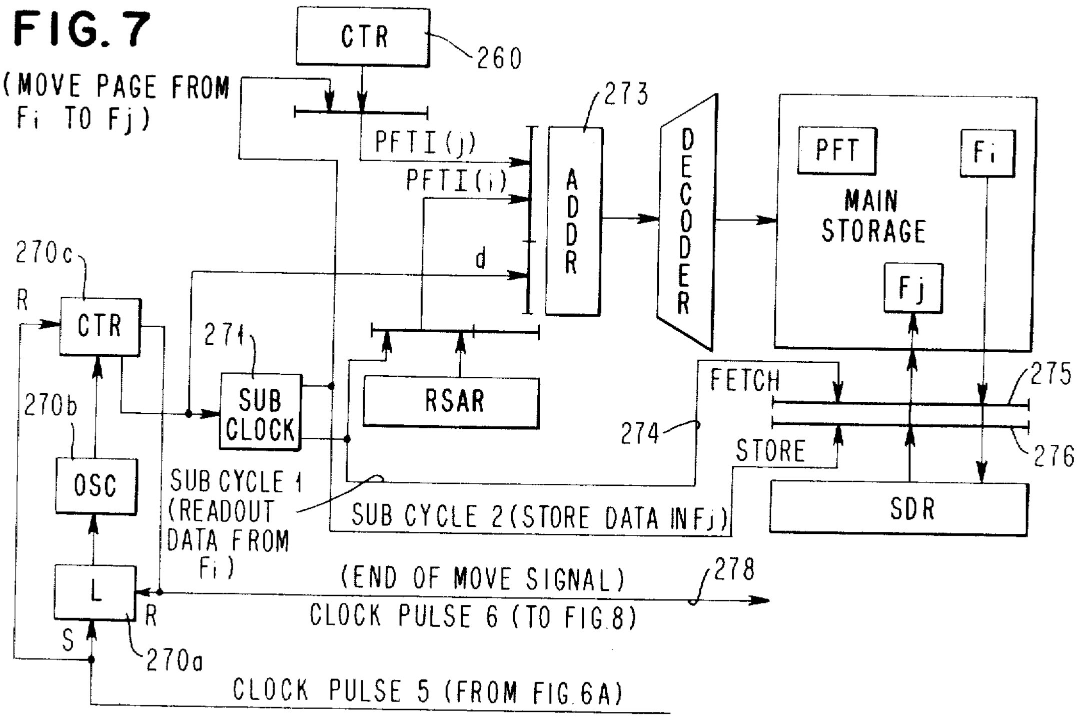
FIG. 8 (MOVE VA, T, C, F, & M FROM i TO j)
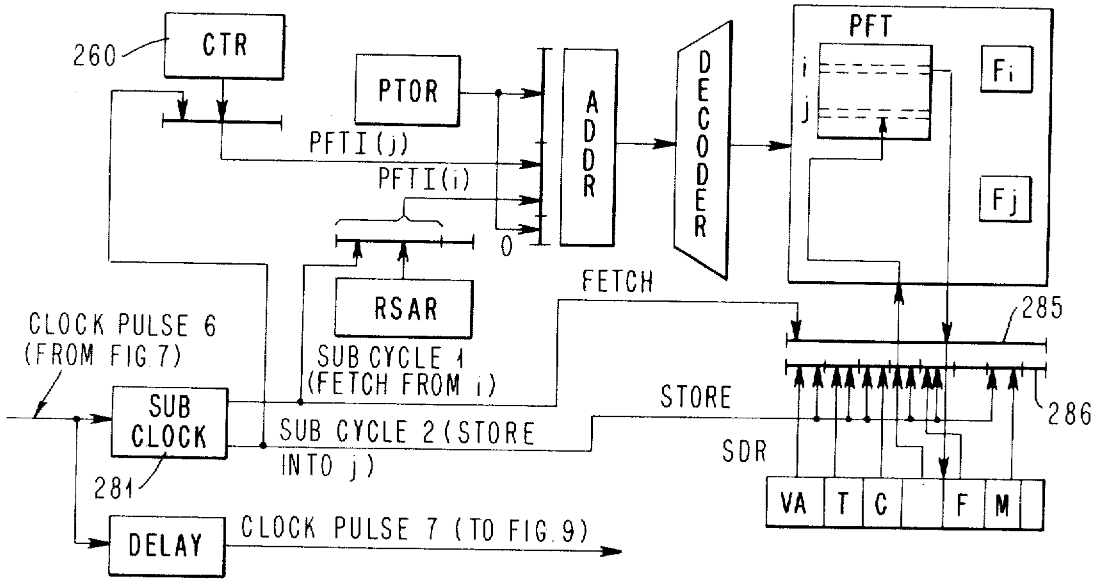

FIG. 9 (IN i, RESET BITS V & L, & SET VA TO ZERO)
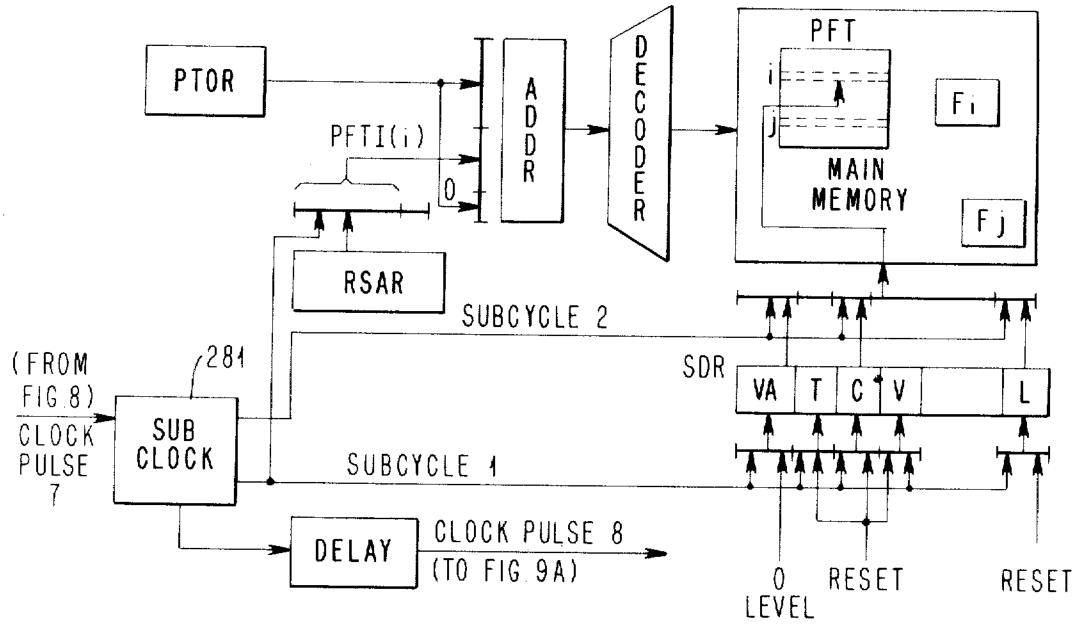
FIG. 9A (IN j, SET BIT V, & RESET BIT L)
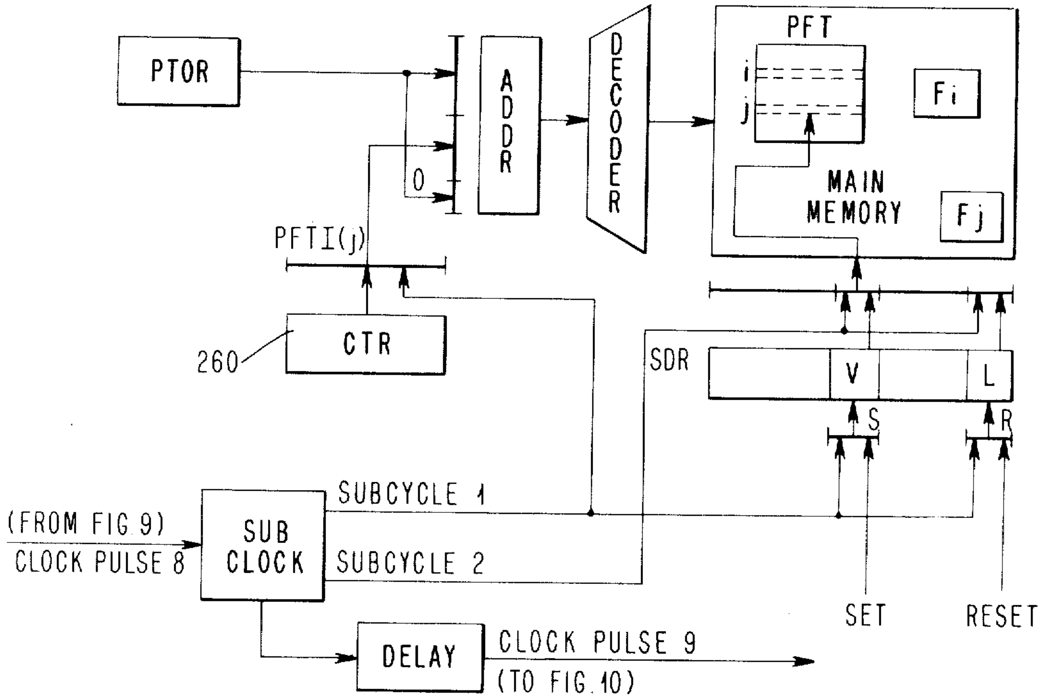

FIG. 12 (ACCESSING i UPON ECC EVENT & D LATCH IS NOT SET)
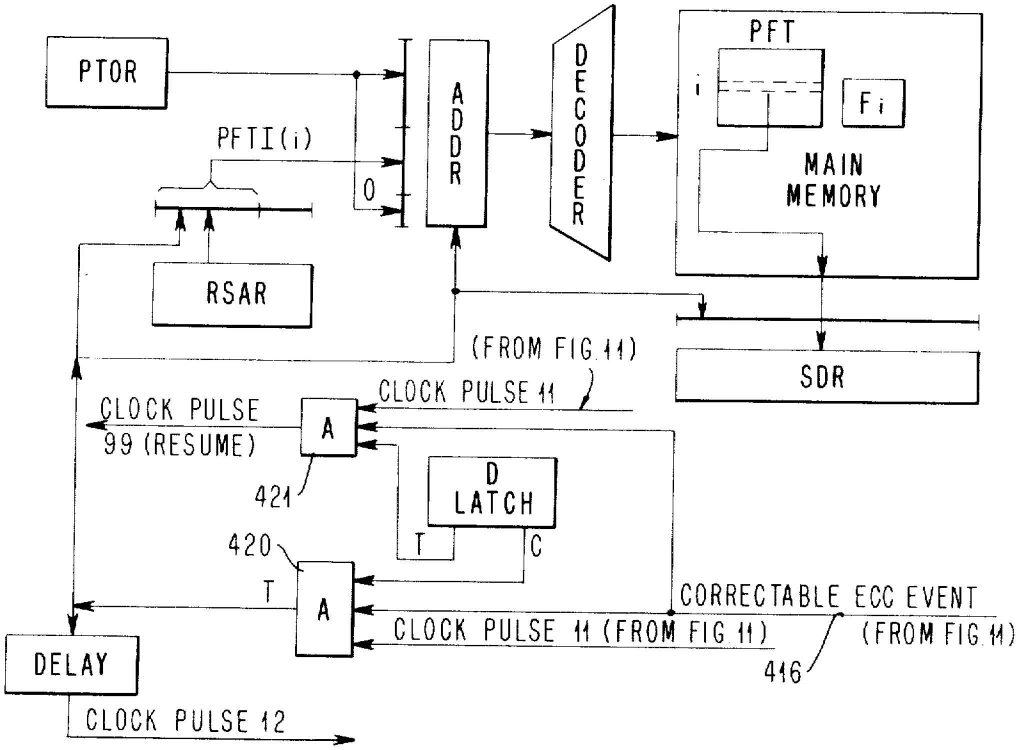
FIG. 13 (INDICATING Fi IS DIRTY)
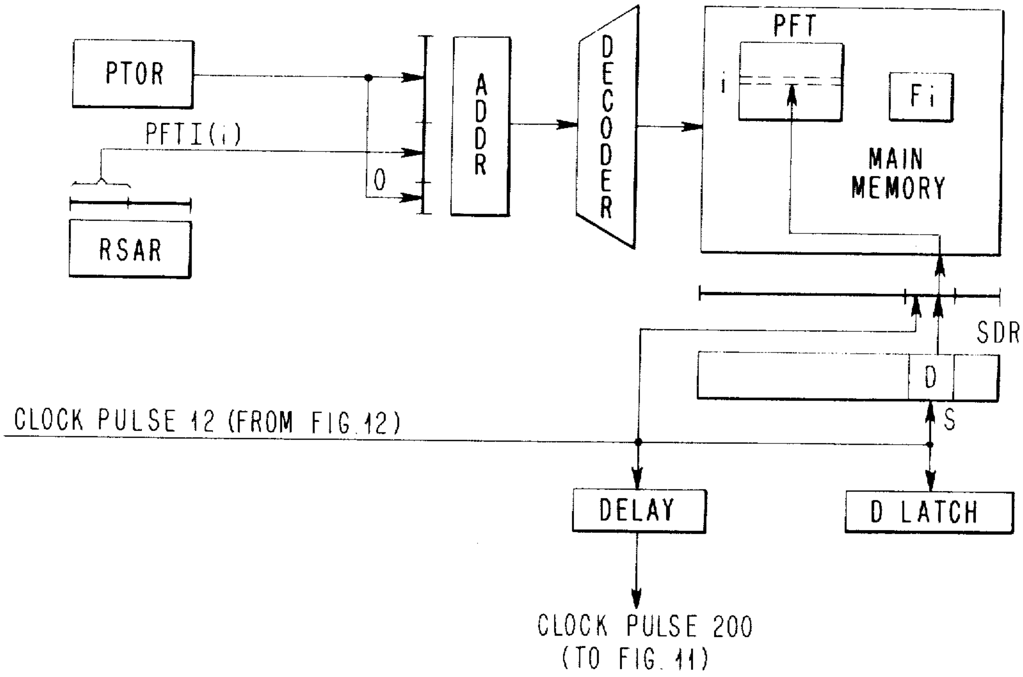

SYSTEM FOR IMPROVING THE RELIABILITY OF SYSTEMS USING DIRTY MEMORIES

BACKGROUND OF THE INVENTION

Prior memory reliability technology has concentrated on avoiding the use of portions of main memory having a hard error therein, such as is found in the following prior patents and patent application: U.S. Pat. application Ser. No. 316,164 filed Dec. 18, 1972 by D. C. Bossen, etal (IBM) and entitled "Dynamic Address Translation Scheme Using Orthogonal Latin Squares;" U.S. Pat. No. 3,222,653 by R. Rice (IBM), issued Dec. 7,1965 entitled "Memory System for Using a Memory Despite the Presence of Defective Bits Therein;" U.S. Pat. No. 3,234,521 by J. A. Weisbecker (RCA), issued Feb. 8, 1966 entitled "Data Processing System;" U.S. Pat. No. 3,245,049 by F. E. Sakalay (IBM), issued Apr. 5, 1966 entitled "Means for Correcting Bad Memory Bits by Bit Address Storage;" U.S. Pat. No. 3,331,058 by H. A. Perkins, Jr. (Fairchild Camera and Instrument Corp.) issued July 11, 1967 entitled "Error Free Memory;" U.S. Pat. No. 3,350,690 by R. Ricke (IBM) issued Oct. 31, 1967 entitled "Automatic Data Correction for Batch-Fabricated Memories;" U.S. Pat. No. 3,422,402 by F. E. Sakalay (IBM), issued Jan. 14, 1969 entitled "Memory Systems for Using Storage Devices Containing Defective Bits;" U.S. Pat. No. 3,434,116 by W. Anacker (IBM) issued Mar. 18, 1969 entitled "Scheme for Circumventing Bad Memory Cells;" U.S. Pat. No. 3,444,526 by R. P. Fletcher (IBM) issued May 13, 1969 entitled "Storage System Using a Storage Device Having Defective Storage Locations;" U.S. Pat. No. 3,460,094 by R. L. Pryor (RCA) issued Aug. 5, 1969 entitled "Integrated Memory System;" U.S. Pat. No. 3,585,607 by H. De Haan, etal (U. S. Philips Corp.) issued June 15, 1971 entitled "Memory with Redundancy;" U.S. Pat. No. 3,644,902 by W. F. Beausoleil (IBM) issued Feb. 22, 1972 entitled "Memory with Reconfiguration to Avoid Uncorrectable Errors;" U.S. Pat. No. 3,681,757 by C. A. Allen, etal (Cogar Corp.) issued Aug. 1, 1972 entitled "System for Utilizing Data Storage Chips which Contain Operating and Non-Operating Storage Cells;" U.S. Pat. No. 3,713,109 by L. M. Hornung (IBM) issued Jan. 23, 1973 entitled "Diminished Matrix Method of I/O Control;" U.S. Pat. No. 3,714,637 by W. F. Beausoleil (IBM) issued Jan. 31, 1973 entitled "Monolithic Memory Utilizing Defective Storage Cells" U.S. Pat. No. 3,715,735 by W. E. Moss (Monolithic Memories, Inc.) issued Feb. 6, 1973 entitled "Segmentized Memory Module and Methods of Making Same" and U.S. Pat. No. 3,735,368 by W. F. Beausoleil (IBM) issued May 22, 1973 entitled "Full Capacity Monolithic Memory Utilizing Defective Storage Cells."

This invention provides a newly discovered method of using portions of main memory which have a limited amount of hardware error therein without detracting from the reliability in the use of the computer system.

The traditional view has been that each useable portion of a computer's main memory component was equally reliable, and that data written in the memory will have equal reliability assurance. In reality, however, different useable portions of main memory are not equally reliable. In fact, equal reliability is not required for different types of uses for data found in main memory, i.e., read use and write use.

The previously mentioned view that the various portions of the main memory component are equally reliable for all uses of data is false. For example, many current memories use error correction codes which give single bit error correction and double bit error detection over each unit of memory, e.g., byte or word. A unit of memory, e.g., a word, with this error correction code will still operate correctly by returning the correct contents, even when a single bit storage entity goes bad. When more than a one bit storage entity goes bad in any memory unit covered by the single bit error correction, a data error can occur.

The memory portions which are functionally useable are actually either "clean" (i.e., they do not cause any errors), or "dirty" (i.e., one or more correctable errors have been caused which have used up, but have not exceeded, the error-correcting capability of any unit in the memory portion). Memory portions not functionally useable are "bad" (i.e., causes errors exceeding the error correction capability of the memory portion).

Thus a unit of memory, e.g., a word, which is clean, can cause a bit error and the memory still provides the correct output from the unit; but a unit of memory which is dirty becomes bad if any further bit error occurs within it to exceed its error correctability. A portion of memory comprises a plurality of units of memory. A portion is dirty if any, some, or all of its units are dirty, as long as none of its units exceeds the error correction capability for the memory readout. The portion becomes bad if any unit becomes bad.

Clean memory units have been found experimentally to have a probabilistically greater reliability than dirty units. Also, past experience indicates that bit storage failures are more likely to occur near where previous bit storage failures occurred, so that dirty portions have a greater likelihood of having more failures.

Whether a data error will occur due to the failure of a bit storage entity, e.g., core or latch, often depends on the state of the data bit stored in that bit storage entity in the memory. For example, a failed bit entity may provide an output which always appears as a "0" data bit, in which case it will not cause any readout error as long as 0 data bits are stored in it. However when a "1" bit is put in it, a readout error will occur and will be sensed by an error detecting circuit which uses an error detecting code provided with the data in that unit of memory hardware.

The prior art has recognized the distinction between a no-error condition (i.e., clean condition) and a corrected error condition (i.e., dirty condition). For example the IBM FE guide SY22-6834-1, entitled "System/370 Model 165 (Volume 5)", page 1 – 3 mentions a "soft machine check latch" being turned on when an error is detected, corrected and that execution continues.

Many large computer systems currently are using main memories which are partitioned into page frames, each of which may store a "page" of data containing up to 4,096 bytes. Such paged main memory is found in a computer system having a hierarchial storage subsystem, such as an IBM S/370 M158 in which pages are generally brought into main memory from some backing storage device, e.g., a disk unit. The I/O device retains a backup copy of the page in main memory UNLESS the page is changed in the main memory. That is, if an unmodified page is destroyed in main memory upon completion of its use, another copy of the page can be fetched from the backup I/O device for later use.

But if a page is destroyed by a memory unit failure after a page is modified, it is impossible to recover the correct content of the modified page from the backup I/O device. Thus, it is more important in a hierarchial memory system to protect modified pages in main memory than to protect unmodified pages in main memory.

The prior art has recognized that a page frame in a memory can be eliminated from use by a permanent error condition in the page frame whether or not the error correcting capacity of the frame has been exceeded. The elimination of a page frame is best made from a reliability viewpoint when it only causes a correctable error. The elimination of all page frames having any error can have a large economic impact with imperfect memory manufacturing technologies.

The invention is applicable to technological operations internal to a computer machine which are not apparent to a user of the machine, whenever internally in the machine's electrical signal paths, a real memory address (as opposed to a virtual memory address) is assigned for fetching or writing a field in its main memory hardware component. The real address may be the only type of address used in a computer system, or it may be the address derived from a translated virtual address. The invention is applicable in either case, and any manner of translating to the real address provided to the subject invention is a preliminary operation which makes no difference to the invention. However it may make a difference to the housekeeping functions related to matters surrounding an embodiment of the invention. Since today many of the most advanced types of computer systems generate real addresses from virtual addresses, the real addresses used in the embodiments herein assume that real addresses are being derived from virtual addresses. The technology for the electrical translation of real addresses to virtual addresses in such a system is therefore outside of the realm of the subject invention, and such virtual to real address translation is done outside of the embodiments of the subject invention; and it may be done by any of many different techniques, for example, the dynamic address translation (DAT) mechanism in the IBM S/370 M155II, S/370 M165II, S/370 M158, or S/370 M168, etc.

In such virtual address types of systems, the main memory component is partitioned into N number of equal size recordable portions called page frames, each of which may for example have a recording capacity for 4,096 bytes. A page frame table (PFT) is a housekeeping tool for indicating the current assignments of and the states of the page frame in real memory.

OBJECTS OF THE INVENTION

An object of this invention is to improve the reliability of computer systems without requiring any change in the reliability of the components in the system. That is, this invention reduces the impact of the component errors on the system without attempting to improve the component reliability.

It is another object of this invention to improve system reliability by ensuring that changed data always resides in the most reliable portions of a computer's memory, so that an uncorrectable memory failure is less likely to occur in a changed page, and the less reliable memory portions are made to contain only unchanged data. Destruction of unchanged data will not reduce system reliability, since a backup copy exists at a lower level in the system's storage hierarchy.

It is still another object of this invention to provide a system which can reliably continue to use a hardware memory portion which has one or more correctable error conditions almost the same reliability that would be obtained by eliminating all page frames having correctable errors.

It is a further object of this invention to significantly improve the economics of using imperfect memory manufacturing technologies in a computer system in a manner which obtains reliable system operation.

SUMMARY OF THE INVENTION

This invention provides an automatic hardware controlled process for use in a computer machine to ensure that changed data is always stored in "highly reliable," or clean memory portions, thus improving the overall reliability and economics of the computer machines use, while making use of lesser reliable, or dirty memory portions for unchanged data or instructions without detracting from the reliability of using the computing machine.

The invention detects a dirty condition for any page frame during its fetch operations, and once detected thereafter indicates the dirty condition for a respective page frame. Also, before any change is permitted to any data in its main memory, e.g., any page frame, the invention moves the data existing in the dirty page frame to a clean page frame, and then commences the write operation.

DESCRIPTION OF THE DRAWINGS

FIGS. 2 and 2A illustrate flow diagrams for a method embodiment of this invention.

FIGS. 3 through 13 illustrate a hardware embodiment implementing the method invention.

DETAILED DESCRIPTION

Figure 1:
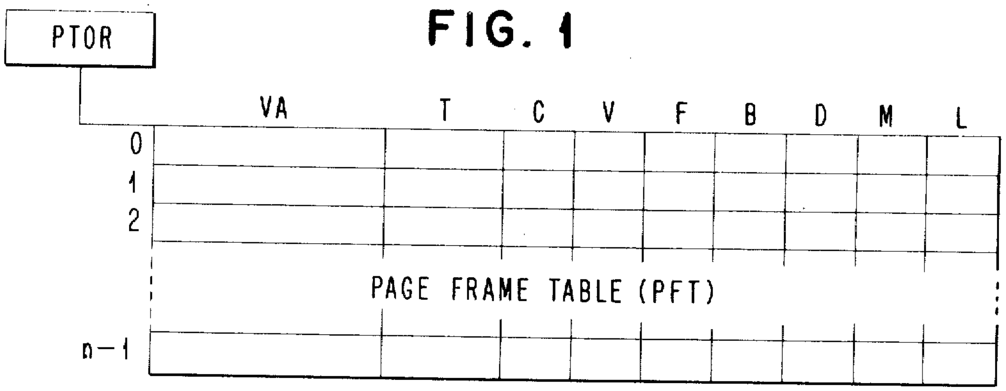
FIG. 1 illustrates a page frame table used by an embodiment of the invention.

FIG. 1 illustrates a page frame table PFT which has N number of elements labeled 0 through N-1 which provide the housekeeping for respective page frames in the main memory component of a computer machine. Each PFT element contains a virtual address (VA) currently assigned to its respective page frame, and it also contains flag field T and a plurality of flag bits C, D, F, B, D, M and L which indicate various physical states pertaining to the recorded content of the respective page frame called a "page." The meaning of these flag fields and bits in each PTF element is shown in the following legend:

FLAG LEGEND

- VA - Virtual Address assigned to the respective page frame.
- T - Time indication since a last reference was made to the related page.
- C - Page has been changed, i.e. at least one field in the related page was modified since the current VA was assigned.
- V - The page frame table entry is valid.
- F - Page is fixed in main storage, i.e., may not be removed from the related page frame.

B - Page frame is bad, e.g., causes uncorrectable errors, and may not be used.

D - Page frame is dirty, i.e., causes correctable errors.

M - Mask for dirty page bit D, i.e., D is checked only when M is set.

L - Page frame is locked from other users i.e., accessable only to the locking user.

This invention is concerned with the setting and use of the flag bit D, which indicates whether its related page frame is dirty. Therefore the invention is concerned with the operation of the embodiment when the mask bit M is set, thereby enabling the use of the dirty bit D.

In FIG. 1, a pointer register (PTOR) contains the real address of the page frame table (PFT) which may be located anywhere in a main memory of the computer system.

The real address (RA) location in the main memory of frame Fi is related to the relative page frame table index PFTI of element i as follows: FiRA=(i × D), where i is the index of element i in PFT, and D is the size of a page frame e.g., 4,096 bytes is a commonly used page frame size. The real address (RA) location of any byte in a page frame is therefore expressable as: Byte RA =(i × D + d), where *d* is the byte displacement of the address from the beginning of Fi, and D-1 is the maximum value of *d*.

Hence, given the real address PTOR of a page frame table, any PFT element i is accessible at the real address: iRA=PTOR+(*i* × *g*), where *g* is the byte length of each element in the PFT.

It is common practice to locate a page frame table and its elements at address boundaries which are powers of 2 by making the maximum values of each of *i*, *g*, and *d* a power of 2. In such case, given a binary real address (e.g. 24 bits) for any byte in any page frame Fi, a first set of its highest order non-zero bits (e.g., 8 highest order bits) represents the index of its related element *i* in the PFT; and a second set of its low order bits (e.g. 12 bits) contiguous with the first set, represents the byte displacement d in the page frame Fi. The real address of the related element i is derivable from the byte real address by setting the d bits to zero, e.g., lowest order 12 bits. The read address of the related PFT element *i* is also derivable by concatentating the PTOR content to the *i* bit field in the byte real address and setting all lower order bits to zero, e.g., lowest order 12 bits. For example, with a main memory of 1,048,576 bytes capacity (i.e. $2^{20}$ = 20 bits) and using 24 bit addressing, the byte real address may have bit positions 0 – 3 set to zero, 4 – 11 set to *i*, and 12 – 23 set to *d*. Then the related FiRA is derivable from this 24 bit address by merely setting to zero its lowest-order d bit positions 12 – 23. The related iRA is also derivable from the Byte RA. Assuming *g* is $2^6$ (i.e., 64 bit word for each element), then the 24 bit address will have its six lowest order *g* bits 18 – 23 set to zero, its next eight bits 4 – 11 are set to *i*, and its six highest order non-zero bits 4 – 9 are set to the content of the PTOR register.

Figure 2:
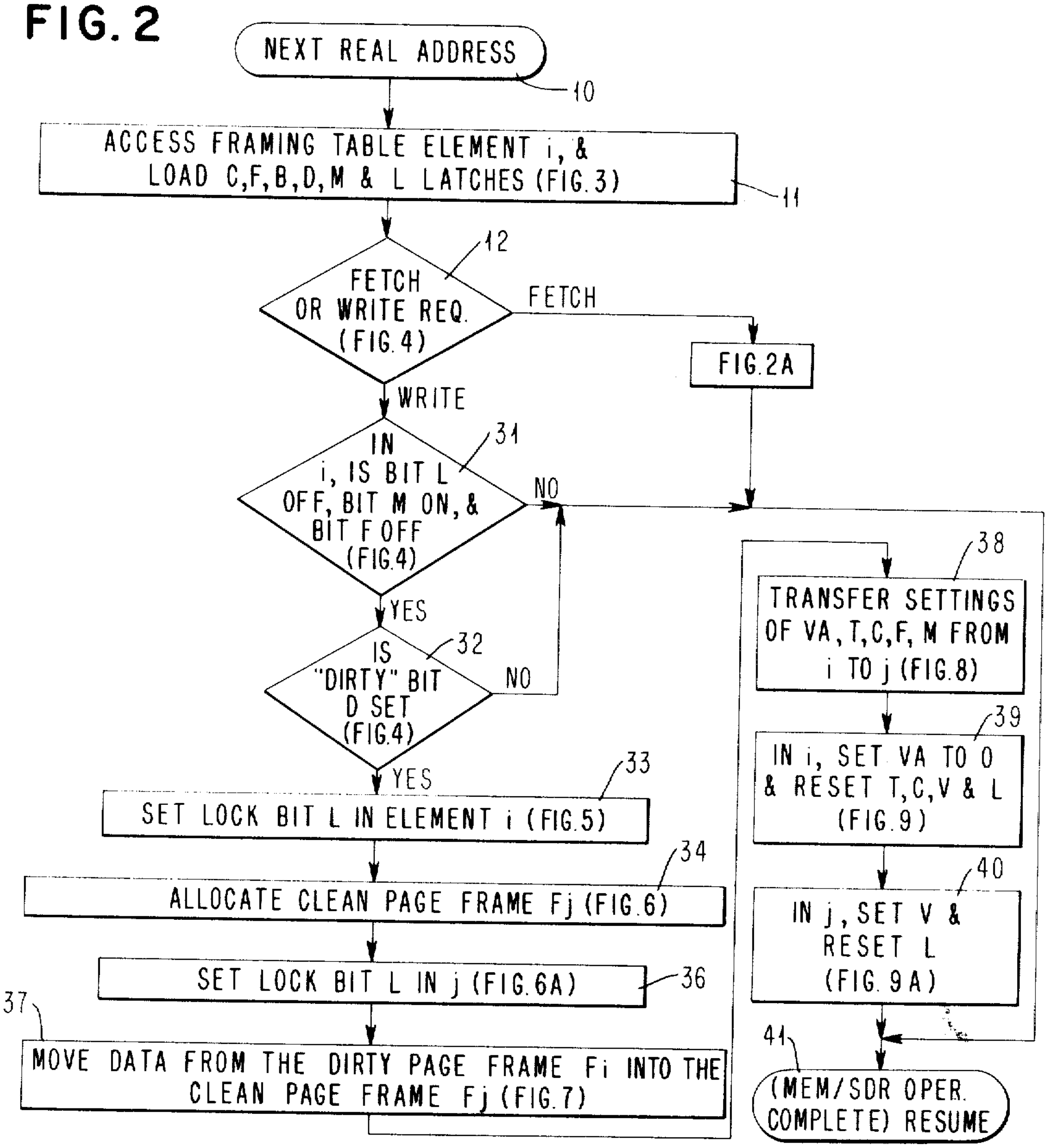

The method embodiment in FIGS. 2 and 2A controls the setting and resetting of particular flag bits and fields in the page frame elements in the page frame table shown in FIG. 1.

FIGS. 2 and 2A embody the methods provided by this invention. Step 10 in FIG. 2 represents the input required by the invention, which is that the electrical signals for each next real memory address be provided as the input to this invention.

As previously mentioned, the selection of the real address is done by a dynamic translation mechanism outside of the scope of this invention, e.g. by any of many different means well known in the art. The electrical signals comprising the real address determines the selection of a particular PFT element i through the addressing mechanism in the machine, i.e., a set of high-order digit signals (e.g. bits 4–11) in the real address provide the index to the particular element i in the PFT. PFT element *i* hence represents frame Fi, and PFT element *j* repesents frame Fj.

The page frame currently being referenced by the inputted real address of step 10 in FIG. 2 is frame Fi. If frame Fi is dirty when a store operation is attempted into it, this invention causes a transfer of the page in frame Fi to a newly assigned frame Fj. Thus *i* and *j* are different elements in the set 0 through N–1 in the page frame table, and elements *i* and *j* respectively describe current conditions for frames Fi and Fj.

Hardware for executing the methods in FIG. 2 and 2A is provided in FIGS. 3 through 13.

After the next real address is inputted to the method in FIG. 2 for the next operand to be fetched from or written into the main memory, step 11 is entered to access PFT element *i* which is related to frame Fi that contains the real address received by step 10. After element *i* is accessed, latches C, F, B, D, M and L are loaded, i.e., set or reset to reflect the current state of bits C, F, B, D, M and L, respectively, in the readout element i. The mask bit is not used in the method in FIG. 2A. (Note: In a system doing virtual to real address translation, step 11 would be performed as part of the dynamic address translation, which would set the D latch, etc.).

Step 12 tests to determine if a fetch or write request at the inputted real address has been signalled. That is, a write request will start a memory write cycle, while a fetch request will start a memory fetch cycle. A write request causes step 12 to take its WRITE exit, while a fetch request causes step 12 to take a fetch exit and enter FIG. 2A.

In FIG. 2A, step 20 is entered which fetches the content at the real address in page frame Fi e.g, one or more data bytes with ECC check bits in the manner well known in the art. Step 21 is then entered which detects any error in the read information. If no error exists, a NO exit is taken to the exit step which goes to step 41 in FIG. 2. But if an error is detected, step 22 is entered from the YES exit of step 21 to determine if the error is correctable. If not correctable, step 26 is entered which is an error handler process that sets the bad bit B in PFT element i to indicate that page frame Fi is bad and should not be used henceforth, and an exit is taken into an error logout and recovery procedure 28 which might first examine the state of change bit C in element i tested by step 27 to determine if a change had occurred in the data in frame Fi. If the C bit is not set, i.e., the data is unchanged, the recovery procedure can reread the data from the backup I/O device into a newly allocated page frame which may be dirty or clean. If the C bit is set, i.e., the data is changed, the recovery procedure can cause a check point restart at a predetermined prior point in the current program to regenerate the page of data in a newly allocated clean page frame, i.e., not having either its D or B bits set.

If step 22 finds the error is correctable, its YES exit is taken to step 23, which determines if the D latch (and thereby the D bit in element i) was previously set when it was loaded by step 11 in FIG. 2 to contain the state of the D bit in the current element *i*. Thus step 23 tests the physical state of the D latch to determine if it indicates that page frame Fi is a dirty page frame. That is, if bit D is on, it indicates that the page frame was previously determined to be dirty; and if it is off, the page frame was previously determined to be clean but now needs to be set to indicate a dirty state in view of the currently detected correctable ECC event. Hence if the D latch was previously set, the YES exit is taken from step 23 to EXIT and to step 41 in FIG. 2 to continue the normal CPU operation with the fetched data in the SDR.

On the other hand if the D bit is not found to have been previously set, the NO exit is taken from step 23 to step 24, so that the D bit can be set to reflect the dirty page condition newly discovered by the current error detection operation. This is done by step 24 reading PFT element *i*, followed by step 25 setting the D latch and setting the D bit in element *i*.

In order that control is not lost by the method in FIG. 2A when the NO exit is taken from step 23 to step 24, the data fetched from main memory into the SDR by step 20 is lost. The reason for this is because the subject method would lose control to the using process which needs to use the fetched data, if the subject process let the using process have the data in the SDR at this point in the subject method, which has other steps 24 or 25 which must be completed. (Note: extra readout storage could be provided for buffering the data fetched by step 20 but this is not done in this embodiment). Accordingly the data needs to be read again into the SDR, and this is done by going from step 25 back to step 20 which again fetches the memory at the same real address. The fetched data cannot be destroyed on its second reading because a different path is now being followed through the method, which is through steps 21, 22 and the YES exit from step 23 since step 23 now finds the D latch was previously set, i.e., it was set by the prior iteration through step 25. Thus the EXIT is taken to step 41 in FIG. 2; and step 41 gives control to the external using process needing the data which was fetched by the second iteration of step 20.

To summarize the operation of the method in FIG. 2A, a page frame Fi is continuously being tested for a dirty condition every time a fetch request is made of the main memory. Whenever a correctable ECC event is discovered, the D latch (and the D bit in PFT element *i*) are set to thereafter reflect the dirty condition for page frame Fi. If the dirty condition is discovered during the current iteration of the method in FIG. 2A, the NO exit is taken from step 23 to cause the D latch and the D bit in element i to be set to thereafter reflect the dirty condition for page frame Fi. But the YES exit is taken from step 23 if step 11 had currently set the D latch to the state of bit D in element *i* to indicate that a dirty condition had been discovered by a prior fetch operation.

In FIG. 2, if step 12 had determined that a write request exists, its WRITE exit is taken to step 31 to find if in element i, its mask bit M is set to indicate the dirty bit D should be examined. If bit M is reset, the dirty bit D is ignored and the NO exit is taken to step 41 to resume normal operations. Also if its lock bit L is ON, or if its page fixed bit F is on, element i cannot be currently accessed and the operation is suppressed by going to step 41. But if lock bit L is off, the page fixed bit F is off, and mask bit M is on, step 32 is entered to examine if the dirty bit latch D is set by the dirty bit D in element *i*. If latch D is not set (indicating Fi is not dirty), the NO exit is taken to step 41 which causes the write operation to resume at the current real address in page frame Fi in main memory.

On the other hand, if bit D is set, the YES exit is taken from step 32, to step 33 which sets the lock bit L in PFT element i to prevent any other user of the computer system from addressing any field in page frame Fi.

Then step 34 is entered which causes the memory allocation feature (a standard feature in commercial computer systems) to allocate a new page frame table element *j* (and thereby its page frame Fj) which has its bits C, F, B, D and L in an off state in element *j* and T greater than the ATR output. This allocates a page frame Fj which is clean, i.e., no error has been previously detected in it. Therefore the allocated page frame Fj is not changed, not fixed, not bad, not dirty, not locked, and not referenced for a time duration indicated in the ATR.

Then step 36 sets the lock bit L in element *j* to prevent any other user from accessing the element *j* or referencing its frame Fj.

Then step 37 moves the page of data from the dirty page frame Fi into the newly allocated clean page frame Fj. The move operation copies each byte of data into the same relative address in Fj that it had in frame Fi in relation to the beginning of each respective page frame.

Then step 38 transfers from element i to element j the settings of the VA field, the T field and the flag bits C, F and M, none of which are changed during this transfer.

Then step 39 operates on element i by setting its virtual address (VA) field to zero to indicate its page frame Fi is no longer assigned to any virtual address. Also step 39 resets the flag bits T, C, V and L to indicate that the element i has not time indication, no change indication, its virtual address is invalid, and that its lock bit is off.

Step 40 operates in element *j* to set its flag bit V to indicate that element *j* is valid and resets bit L to indicate that page frame Fj is no longer locked from other users.

Then step 41 is entered which indicates that the operations of this invention on this real address are completed between main memory and the SDR, and that control can now be passed to the system to resume normal processing.

HARDWARE ACRONYM LEGEND

| | |
|---|---|
| ADDR | Memory Address Register |
| ATR | Age Threshold Register |
| B | Bad Page Bit |
| CTR | Counter |
| D | Dirty Page Bit |
| DAT | Dynamic Address Translation |
| F | Fixed Page Bit |
| L | Lock Bit |
| M | Mask bit for dirty page bit |
| PFT | Page Frame Table |
| PFTI(*i*) | Page frame table index for element *i* |
| PFTI(*j*) | Page frame table index for element *j* |
| PTOR | Page Table Origin Register containing the beginning of Memory Frame Table |
| RSAR | Real Store Address Register Containing a page frame index field and byte |

| | |
|---|---|
| | displacement field |
| SDR | Storage Data Register |
| T | Time since last use field |
| V | Validity bit |
| VA | Virtual Address field |

The hardware execution of the methods in FIGS. 2 and 2A begins with the hardware in FIG. 3 when the next real address needed in the main memory is applied to a line 200. Line 200 may receive that address from a dynamic address translation (DAT) mechanism, or from an instruction counter, or from a field in a program status word, etc. The address is loaded into a real storage address register (RSAR) to locate a unit of data in the main memory. A set of the high order bit positions in register RSAR identifies a page frame element i in the page frame table PFT and thereby also identifies the corresponding page frame Fi; this set of high order bits is designated PFTI(i). A set of low order bit positions in RSAR identifies a byte displacement d relative to the beginning of the page frame.

The concatentation of the two sets PFTI(i) and d provides the complete address for a data unit in a page frame Fi.

The memory address for element i is derived by superimposing the PFTI(i) set of bits on the address bits of the page frame table from a register PTOR. For example, normally the PTOR register provides a set of high-order non-zero bits followed by lower-order zero bits, representable as PTOR/O. The PFTI(i) bits are OR-ed with the high-order zero bits to provide the element i address, i.e., PTOR/PFTI(i)/0, which is applied to an address register (ADDR) that is decoded by a conventional main memory decoder (DECODER) to access element *i* in the PFT in main memory and transfer its contents to a storage data register (SDR).

The clocking for the hardware is provided by a distributed set of delay elements found in FIGS. 3–13. FIG. 3 provides the operation for step 11 in FIG. 2. The clocking begins in response to a start clock pulse provided from a single shot multivibrator (SSMV) in FIG. 4 when either a fetch request latch or a write request latch is set by a fetch or store request to the main memory. In FIG. 4, the request latches are set in the conventional way currently done in computer systems for determining memory fetch or store cycles, e.g., from the instruction type operation field, IC counter, interrupt signal, etc. At the time of the start clock pulse, i.e., the fetch or store request the real address provided to ADDR, element i is set into the SDR in FIG. 3. Then, the start clock pulse gates the various field of element i in the SDR through AND gates A into a plurality of registers and latches shown in FIG. 3. The delay element in FIG. 3 outputs clock pulse 1 which is provided to FIG. 4 to actuate the next step in the process.

In FIG. 4, AND gate 220 receives the true (T) output of the fetch request latch and the clock pulse 1 from FIG. 3 to provide clock pulse 100 as a result of a memory fetch request. Clock pulse 100 is provided to FIG. 11 to begin the execution of the method in FIG. 2A.

An AND circuit 221 receives the true (T) outputs of the M and D latches and the complimentary (C) outputs of the F and L latches. The true (T) and complimentary (C) output lines from AND circuit 221 are provided to AND circuits 223 and 224 which also are conditioned by the true (T) output line from the write request latch to respectively generate clock pulse 2 to FIG. 5 and clock pulse 99 which resumes the write operation in the conventional manner done in current computer systems.

The M bit is a mask bit which enables the use of the dirty bit D. Thus bit M must be set to enable the use of bit D. That is, if M is reset i.e., off), the D bit is disabled and thereby ignored. Thus the reset state of bit M always maintains the complimentary output from the AND circuit 221, which thereby provides clock pulse 99 (rather than clock pulse 2) to resume the write operation and ignore all the remaining steps 31 through 40. The result will be that the write operation will resume at the real address in page frame Fi.

Clock pulse 100 from FIG. 4 signals the fetch exit from step 12 in FIG. 2. On the other hand, clock pulse 2 signals the WRITE exit from steps 12, and the YES exits from steps 31 and 32 in FIG. 2. But clock pulse 99 in FIG. 4 signals the NO exit of either or both steps 31 and/or 32 in FIG. 2.

FIG. 5 sets the lock bit L in element i to execute step 33 in FIG. 2. Thus clock pulse 2 sets bit position L in the SDR register, and the addressing state PFTI(i) is continued through the decoder so that the L bit in the SDR is transferred into the PFT element i to set its lock bit. A delay unit in FIG. 5 receives clock pulse 2 and provides clock pulse 3 to FIG. 6.

FIG. 6 performs the allocation step 34 in FIG. 2 in a particular way, which is one of many different ways that the allocation step may be performed. In FIG. 6 a sequential scanning is done of the elements in a page frame table from its beginning element 0 and the first element is selected which has a time field T which exceeds the time in an age threshold register (ATR), provided that its bits B or D indicate that it is a clean page, that bit F indicates the page is not fixed in its frame, and that bit C indicates the current page is not changed, and that the L bit is reset to indicate that the element is not locked.

A counter 260 in FIG. 6 receives clock pulse 3 which resets the counter to its zero state in which it addresses the initial element 0 in the page frame table. Element 0 is fetched into the SDR and its field T is brought into the B input of a compare circuit 261 and its flag bits T, C, F, B, D and L are brought into the input of an OR circuit 262. Input A of compare circuit 261 receives the output of the age threshold register. If circuit 261 finds that field T is less than the age threshold, or if any of the flag bits to circuit 262 are not in the required state, the true (T) output of the OR circuit is provided to step counter 260 to its next value which addresses the next PFT element, which is then fetched from main memory into the SDR, and the process repeats until the complimentary (C) output is actuated from OR circuit 262 which indicates that the final content in counter 260 indexes the selected element and its represented frame is available for use; and this newly selected element is element *j* and its page frame is Fj. Element *j* is currently in the SDR.

Upon the selection of the new element *j*, the complimentary (C) output from the OR circuit provides the next clock pulse 4 to FIG. 6A. In FIG. 6A the lock bit L is set in element *j* in the SDR. Thus the clock pulse 4, and a set signal, set the L bit in the register SDR, which is transferred to element *j* in the PFT, since element *j* continues as the address index from the counter 260 through the addressing and decoder circuitry to the main memory. A delay unit in FIG. 6A receives clock pulse 4 and provides an output which is clock pulse 5 to FIG. 7.

FIG. 7 performs step 37 in FIG. 2 by moving the data from a dirty page frame Fi to a clean page frame Fj. This is done in FIG. 7 when clock pulse 5 actuates an oscillator and counter 270 which provide a number of pulses equal to the number of transfers needed in main memory to transfer the data of the page, e.g., 4,096 pulses for a page of 4,096 bytes where the transfers are by byte units. The counter 270C output is provided as the displacement d component in the register RSAR to increment the displacement d through a count of 4,096 which is used in each page frame for each unit move operation. A subclock 271 receives the counted oscillator pulses from counter 270C, and each pulse provides an output subcycle 1 followed by an output subcycle 2 from subclock 271. Subcycle 1 controls the reading out of a byte in the page of data from page frame Fi, and subcycle 2 controls the storing of that byte into the clean page frame Fj. Counter 260 still contains the index for element j, i.e., PFTI(j); while the high-order part of register RSAR retains the index for the dirty element i, i.e., PFTI(i), which are alternately selected by subcycles 1 and 2 for generating thp byte addresses in Fi and Fj, respectively.

Thus in FIG. 7, each subcycle 1 actuates the PFTI(i) output from register RSAR to address circuit 273 which also receives the byte displacement d from page move instruction control 272 to generate the address in frame Fi for the current byte to be moved therefrom. The sybcycle 1 also actuates a fetch line 274 to the SDR gate 275 to cause that data unit to be transferred into the SDR register. This is immediately followed by subcycle 2 which gates the PFT(j) output from counter 260 to the address circuit 273 which is still receiving the same displacement d from control 272, whereby the address circuit 273 generates the corresponding data unit address in frame Fj. Subcycle 2 actuates the store line 276 which enables gate 276 to transfer the data unit from the SDR register back to the main memory at this location d in frame Fj. Therefore the oscillator and counter circuit 270 cycle continuously until the page move is complete whereupon the end of the move is signalled by a line 278 from counter 270C which provides clock pulse 6 to FIG. 8.

In FIG. 8, step 38 in FIG. 2 is executed by transferring the settings of the fields VA and T and the flag bits C, F and M from the dirty element i to the clean element j in the PFT. Thus in FIG. 8, a subclock 281 is actuated by clock pulse 6 from FIG. 7. (Subclock 281 may be the same subclock 271 found in FIG. 7.) Subclock 281 provides a two subcycle sequence output comprising subcycle 1 and subcycle 2 in which subcycle 1 performs a fetch from the main store into the SDR and subcycle 2 performs a store from the SDR back into the storage. The address of the fetch is from element i in the PFT, and the address of the store is in element j in the PFT. The fetch may fetch the entire element i through gate 285 into the SDR, but the store can not store the entire content of the SDR but can only store the selective fields which are to be transferred, i.e. VA, T, C, F, and M. Thus the store subcycle 2 selectively actuates the SDR gate 286 so that only the required parts are transferred to the memory data bus. In FIG. 8, a clock pulse 7 is generated through a delay unit receiving clock pulse 6.

FIG. 9 executes step 39 in FIG. 2 by operating in element i to set its virtual address field to all zeros, and to reset its T, C, V and L flag bits. This is done by addressing element i in the PFT using the register RSAR which still contains the index to element i. The content of element i which is pertinent here is still in the SDR, namely the VA field, and flag bits T, C, V and L. Thus subcycle 1 from the subclock 281, after it is actuated by clock pulse 7 from FIG. 8, sets to zero the VA field in the SDR and resets its T, C, V and L fields. Then subcycle 2 gates only these fields VA, T, C, V and L into the element i location in the PFT, the other fields being masked by not being gated from the SDR. A clock pulse 8 is generated in FIG. 9 as a signal from subclock 281 which occurs at the end of subcycle 2.

FIG. 9A illustrates the hardware for executing step 40 in FIG. 2 which sets the validity bit V and resets the lock bit L in the element *j*. Thus in FIG. 9A, the element j is being addressed by the index in the counter 260. During subcycle 1 a set input is provided to the V bit position in the SDR, a reset current is applied to the L position in the SDR, and gates PFTI(j) into the ADDR. Then subcycle 2 causes a transfer of the V and L bits in the SDR into the element *j* in the PFT while the other fields of the SDR are masked by not being gated. A clock pulse 9 is generated through a delay unit in FIG. 9A which is provided at the end of subcycle 2 from the subclock.

Figure 10:
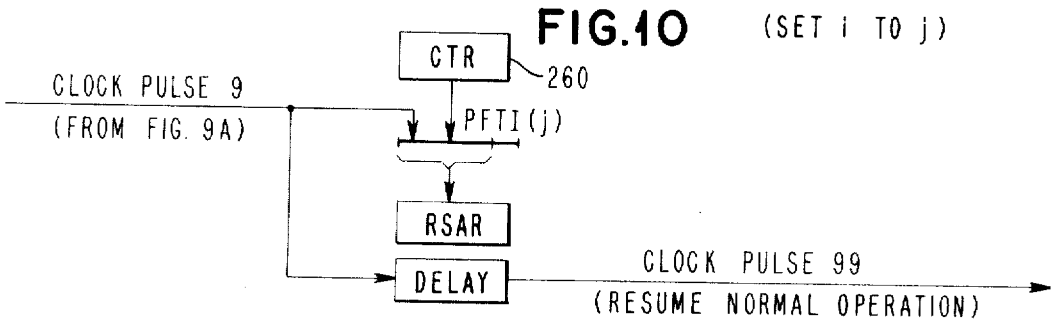

FIG. 10 transfers the element *j* index, i.e. PTFI(j), from the counter 260 into the high-order part of register RSAR under the gating of clock pulse 9 received from FIG. 9A, which does not affect the low-order d part of RSAR, so that the corresponding address in Fj is contained in RSAR. Thereafter the normal addressing done through the register RSAR represents to the using process that page frame Fj was selected, as if page frame Fi was never selected. The using process is not aware of this change from *i* to *j*. The write operation transfer from the SDR to the memory can now continue under the control of the using process, i.e., external program or microprogram, which is not part of the subject invention and this is represented by the resume step 41 in FIG. 2. Clock pulse 99 is provided from the delay unit in FIG. 10 as a result of clock pulse 9, and clock pulse 99 signals the existing hardware system to resume its normal operation.

Figure 11:
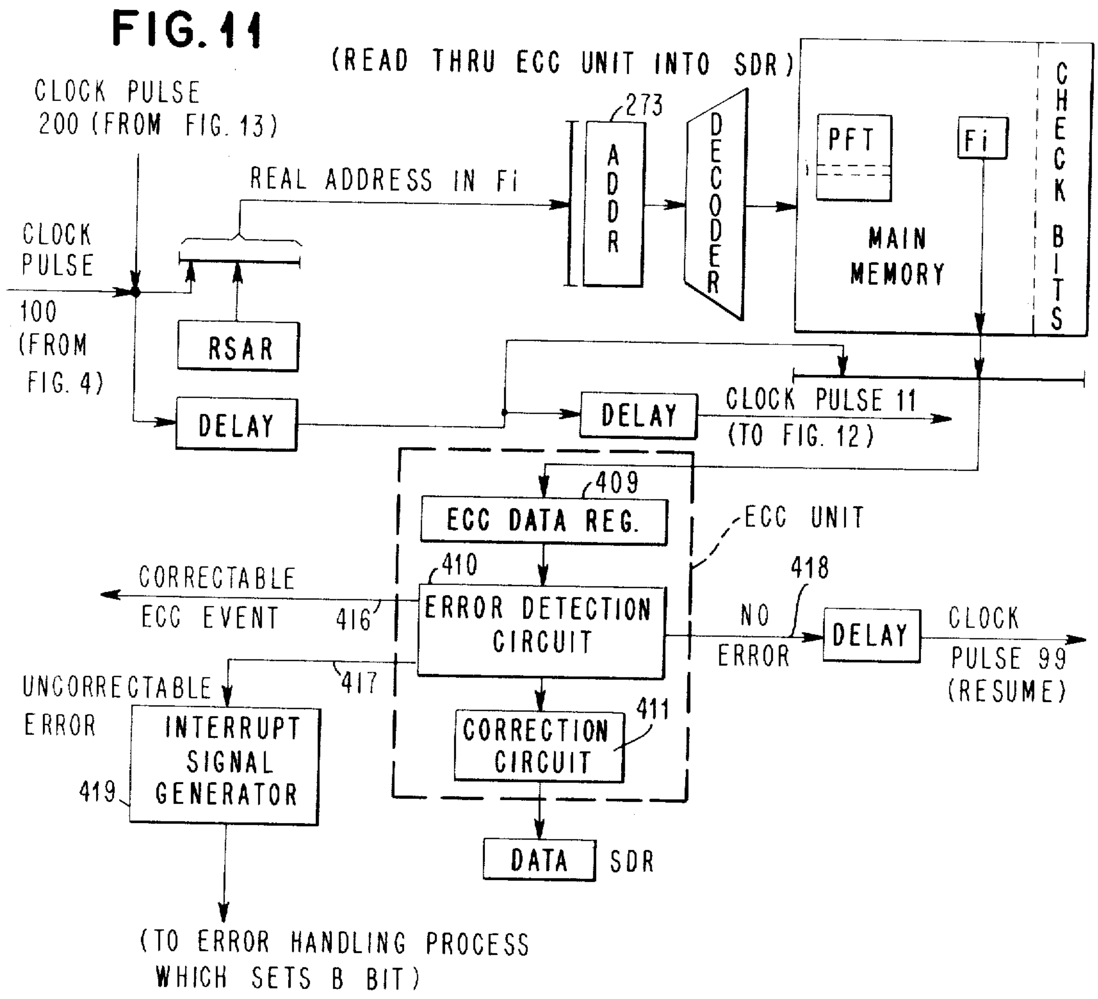

FIGS. 11, 12 and 13 illustrate hardware which executes the method previously described in relation to FIG. 2A when a read request is detected by step 12 in FIG. 2.

FIG. 11 uses the D latch loading executed in FIG. 3, where the current element i was accessed in accordance with step 11 in FIG. 2. Hence if frame Fi was previously found to be a dirty frame, this is now reflected in the current setting of the D latch, which remains after element i is destroyed in the SDR by the operation of the circuits in FIG. 11.

In FIG. 11, the operation is begun when a clock pulse 100 is received from FIG. 4. This causes the currently addressed data in field Fi to be read into an ECC data register 409 in an ECC unit. The current data address is provided to the memory address circuit 273 by the full content of the RSAR register, which contains the read address in two concatenated parts: PFTI(i) and *d*. The RSAR address may, for example, forward the operand address from an instruction, or the address in an instruction counter, or in a program status word. The data is then accessed from the real address in the memory and put in a register 409; and the data in the ECC data register is checked by an error detection circuit 410 which provides an output event signal on one of three lines labeled "no error" line 418, "correctable ECC event" line 416, or "uncorrectable error" line 417. If correctable, the data is provided to an error correction circuit 411 which corrects the data and transfers the corrected data into the SDR register.

If not correctable, an interrupt signal generator generates an interrupt code and an interrupt signal which causes a hardware interrupt in the CPU. The interrupt is cleared by an interrupt handling program of the type commercially known in the IBM OS/360 System. The interrupt handler stores the content of the RSAR register and senses the interrupt code generated by unit 419 to recognize that an uncorrectable error was read from frame Fi, sets bit B in element *i*, and may invoke an error recovery procedure. The error recovery procedure can test the state of the change bit C in the current PFT element *i* to determine if a backup copy of the erroneous page exists on an I/O device, i.e., when the C bit is not changed indicating no change to the data in Fi. But if bit C is on, the error recovery procedure may require a check point restart at a prior place in the using procedure in order to regenerate the data in the erroneous page now located in a newly selected clean page frame Fj.

In FIG. 12, clock pulse 11 is received from FIG. 11 to enable an AND circuit 420 which receives also the correctable ECC event line 416 from FIG. 11 and the complimentary (C) output line from the D latch. Therefore AND circuit 420 is actuated only if the D latch was not set in FIG. 3 when a correctable ECC event is being signalled. When actuated, the output of AND circuit 420 is provided to actuate the PFTI(i) output of register RSAR to cause the memory to access and transfer element *i* from the PFT in the main memory to the register SDR by actuating the addressing output in register RSAR and gating element *i* into the SDR, thereby destroying any data provided therein by FIG. 11.

Thus the hardware in FIG. 12 operates to execute step 24 in FIG. 2A.

In FIG. 13, a clock pulse 12 is received from a delay unit in FIG. 12 to initiate the execution of steps 25 and 26 in FIG. 2A when a correctable error is detected. Also the circuitry in FIG. 13 is actuated by clock pulse 12 while element *i* exists in the SDR. Clock pulse 12 selectively sets the D flag bit in the SDR and the D latch. The resulting state of bit D in register SDR is transferred into element *i* in the PFT. The other fields in the SDR are not transferred and thereby are masked out.

In FIG. 13, an output clock pulse 200 is provided through a delay circuit to FIG. 11.

Pulse 200 actuates the circuitry in FIG. 11 to perform a second read operation for the data previously accessed but which was lost when element i was read in FIG. 12. The circuits in FIG. 11 operate in the same manner as previously described to read the data into the SDR. The circuits in FIG. 11 again provide a clock pulse 11 to actuate the circuitry in FIG. 12, which this time finds the D latch is set, so that AND circuit 420 is not actuated and there is no read out of any PFT element into the SDR and no clock pulse 12 is generated for actuating the circuits in FIG. 13. Therefore the data last readout in FIG. 11 remains unaffected in the SDR. The set state of the D latch now provides an enabling signal to an AND circuit 421 in FIG. 12 which also receives clock pulse 11 and the enabling signal on line 16 to provide an output clock 99 which operates in the same way as clock pulse 99 previously mentioned in regard to FIG. 11 to cause a resumption of the normal CPU processing for the fetched data which is not a part of this invention. Thus the clock pulse 99 in FIG. 12 provides the YES exit of step 23 in FIG. 2A which goes to step 41 in FIG. 2; while the clock pulse 99 from FIG. 11 provides the NO exit from step 21 in FIG. 2A to step 41 in FIG. 2.

The page frame table is in the same main memory as the data in the described embodiment. However the PFT may be in another memory, such as a high speed local memory which can be accessed in parallel with the data fetch or store and at greater speed, although at greater hardware expense and complexity.

The read checking of data in FIGS. 2A and 11 can be done during the fetch part of each write operation in any type of main memory which writes by using a fetch and store cycle; in this case a dirty condition can be detected at any time while changing data in a page frame. As a result, a move of the page to the clean page frame Fj can occur during any data unit write operation, whenever a current data unit is fetched and detected to have an error.

Instead of providing the dirty bit entity, and the other flag bits, in a contiguous table as provided in the preferred embodiment, the dirty bit entity and other flag bits can be contained with the portion of memory it represents, such as for example as the first set (or the last set) of bit position in each respective memory portion. This approach for using this invention would support both equal and unequal size memory portions.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An error-handling method for improving the economics of using imperfect hardware memory technology in the main memory of a computer machine without reducing the reliability of machine operations, comprising the steps of inputting a memory address for accessing a data unit in a portion of said main memory, fetching any content of said unit and providing it as an electrical output signal on a memory bus, detecting any error in said electrical output signal, signalling if the error is correctable, or entering an error recovery process if the error is not correctable, or resuming the predetermined machine execution for said electrical output signal if said detecting step finds no error, setting a dirty latch if said signalling step indicates the error is correctable, and also setting a dirty bit entity in said memory for indicating that said portion of said memory is dirty, if the dirty bit entity and the dirty latch were not previously set to indicate a dirty state for said portion, and signalling to resuming machine execution for said electrical output signal after its error correction by an error correcting circuit.

2. An error-handling method as defined in claim 1, in which after said setting steps, the method includes the further steps of refetching the content of said unit and providing it as an electrical output signal on the memory bus, error-correcting the electrical output signal in an error-correcting circuit, and loading the corrected electrical signals into a register, and entering the resuming signalling step to use the corrected electrical signals.

3. An error handling method for improving the economics of using imperfect hardware memory technology in the main memory of a computer machine without reducing the reliability of machine operations, in which said memory is divided into a plurality of portions, each portion having a related dirty bit entity electrically set to a dirty or clean state indicating whether the related portion has caused a correctable error condition or has not caused any error in the memory output, comprising the steps of machine-signalling a request to write in a data unit at an address contained in a first portion of said memory, electrically sensing the dirty or clean state of the dirty bit entity for said first portion, and if a clean state is indicated then signalling to complete said write request in said first portion, but if a dirty state is indicated then executing the following steps:

machine-allocating a second portion of said memory having a related dirty bit entity that indicates a clean state, moving any data contained in said first portion to said second portion at corresponding addresses relative to the beginnings of said first and second portions, and signalling to complete the machine execution of the requested write operation at a corresponding address in said second portion.

4. An error handling method for improving the economics of using imperfect hardware memory technology in the main memory of a computer machine without reducing the reliability of machine operations, comprising the steps of inputting a memory address for accessing a data unit in a page frame of said main memory, accessing a dirty bit associated with the page frame containing said unit, said dirty bit indicating a previously determined dirty or clean state for said page frame, and loading a dirty latch with the state of said dirty bit, fetching a content of said unit and providing it as an electrical output signal on a memory bus, detecting for an error in said electrical output signal, and indicating if said error is correctable, uncorrectable, or if no error is detected, setting said dirty latch and said dirty bit if the signalling step indicates a correctable error, and resuming machine execution for the electrical output signal after no error is indicated by said detecting step, or after making a correction of said electrical output signal by an error-correcting unit.

5. An error handling method for improving the economics for using imperfect hardware memory technology in the main memory of a computer machine without reducing the reliability of machine operations, in which said memory is divided into a plurality of page frames, each page frame having a related dirty bit entity set to a dirty or clean electrical state indicating whether the related page frame is dirty by having caused a correctable error condition or is clean by not having caused any error in the memory output, comprising the steps of machine-signalling a request to store in a data unit at an address contained in a first page frame of said memory, fetching flag bits for said first page frame, said flag bits including a dirty bit, a mask bit, and a lock bit, wherein the electrical state of said dirty bit indicates a dirty or clean state for said first page frame, the electrical state of said mask bit indicates whether or not the dirty bit is enabled, and the electrical state of said lock bit indicates whether or not a store request can be granted for said address in said first page frame, sensing the electrical state of the dirty bit if said mask bit is set to an enabling state, and signalling to complete said store request in said first page frame if a clean state is indicated by said dirty bit, but if a dirty state is indicated by said dirty bit then executing the following steps:

setting the lock bit for said first page frame to prevent any further requests from accessing it while said lock bit is set, machine-allocating a second page frame in said memory after accessing flag bits for the second page frame in which a related dirty bit indicates a clean state for the second page frame, setting a lock bit in the flag bits for the second page frame to exclude other uses of said second page frame until this lock bit is reset by the current method, moving any data contained in the first page frame into the second page frame at corresponding displacement addresses relative to the beginnings of the first and second page frames, transferring the setting of the mask bit in the flag bits for the first page frame to the mask bit in the flag bits for said second page frame, resetting the lock bit for the first page frame and the lock bit for the said second page frame to permit further use of the first and second page frames, and signalling to complete the machine execution at a corresponding address in said second page frame in response to the request to store data at an address.

6. An error-handling support system for use with the main memory of a computer machine upon receiving each memory address, comprising means for fetching a content of a data unit in a portion of said memory and providing it as an electrical output signal on a memory bus, means for detecting any error in said electrical output signal, including means for indicating if no error or a correctable error or an uncorrectable error is detected, and interrupt means for signalling an error handling process if an uncorrectable error is indicated, first means for signalling the resumption of predetermined machine execution for said electrical output signal if no error is indicated, means for setting a dirty bit entity in response to said indicating means having indicated a correctable error, second means for signalling the resumption of machine execution for said electrical output signal after its error correction by an error correcting circuit.

7. An error-handling support system for use with the main memory of a computer upon receiving a main memory address, in which said memory is divided into a plurality of portions, and each portion has a related dirty bit entity electrically set to a dirty or clean state indicating whether the related portion has caused a correctable error condition or has not caused any error in the memory output, comprising means for requesting a write operation into a data unit at an address contained in a first portion of said memory, means for electrically sensing the dirty or clean state of the dirty bit entity for said first portion, first means for signalling the initiation of execution of a write request in said first portion if a clean state is indicated, means for allocating a second portion of said memory having a related dirty bit entity set to indicate a clean state if said sensing means indicates a dirty state for said first portion, means for moving any data contained in said first portion to said second portion at corresponding displacement address relative to the beginnings of said first and second portions, and second means for signalling the initiation of execution of the requested write operation at a corresponding address in said second portion.

8. An error handling support system for use with the main memory of a computer machine upon receiving each memory address, comprising means for providing a memory address for accessing a data unit in a page frame of said main memory, said main memory fetching a content of the unit at said address and providing the content as an electrical output signal on a memory bus, an error detecting circuit for signalling an error status for said electrical output signal as a no error signal, a correctable error signal, or an uncorrectable error signal, means for generating an interrupt signal for an error handling process upon receiving an uncorrectable error signal, and means for signalling to resume predetermined machine execution upon receiving a correctable error signal, means for fetching a dirty bit entity for said page frame when receiving a correctable error signal, means for setting said dirty bit entity to a dirty electrical state upon receiving a signal indicating a correctable error condition was found, and means for signalling to resume machine execution for the electrical output signal after its correction by an error-correcting unit.

9. An error handling support system for use with the main memory of a computer machine upon receiving a main memory address, in which said memory is divided into a plurality of page frames, each page frame having a related dirty bit entity set to a dirty or clean electrical state indicating whether the related page frame has caused a correctable error condition or has not caused any error in the memory output, comprising means for requesting a store operation in a data unit at an address contained in a first page frame of said memory, means for fetching flag bits for said first page frame, said flag bits including a dirty bit, a mask bit, and a lock bit, wherein the electrical state of said dirty bit indicates a dirty or clean state for said first page frame, the electrical state of said mask bit indicates whether or not the dirty bit is enabled, and the electrical state of said lock bit indicates whether or not a store request can be granted for said address in said first page frame, means for sensing the electrical state of the dirty bit if said mask bit is set to an enabling state, and first means for signalling to complete the store operation in said first page frame if a clean state is indicated by said dirty bit, means for setting the lock bit for said first page frame to prevent any further requests from accessing it while said lock bit is set, means for machine-allocating a second page frame in said memory after accessing flag bits for the second page frame in which a related dirty bit indicates a clean state for the second page frame, means for setting a lock bit in the flag bits for the second page frame to exclude other uses of said second page frame until this lock bit is reset, means for moving any data contained in the first page frame into the second page frame at similar displacement addresses relative to the beginnings of the first and second page frames, means for transferring the setting of the mask bit in the flag bits for the first page frame to the mask bit in the flag bits for said second page frame, means for resetting the lock bit for the first page frame and the lock bit for the said second page frame to permit further use of the first and second page frames, and second means for signalling to complete the store operation at an address in said second page frame corresponding to the received address.

* * * * *